United States Patent [19]

Tomioka et al.

[11] Patent Number: 5,746,870
[45] Date of Patent: May 5, 1998

[54] DEVICE FOR SIMULTANEOUSLY CARRYING OUT VACUUM FORMING, WRAPPING, AND TRIMMING

[75] Inventors: Masanori Tomioka, Hoi-gun; Tetsu Yabuno, Toyokawa, both of Japan

[73] Assignee: Sintokogio, Ltd., Nagoya, Japan

[21] Appl. No.: 651,640

[22] Filed: May 22, 1996

[30] Foreign Application Priority Data

May 26, 1995 [JP] Japan .................................. 7-152172

[51] Int. Cl.⁶ .................................................. B29C 41/50
[52] U.S. Cl. .................... 156/267; 156/212; 156/285; 264/163; 264/249; 425/388; 425/393
[58] Field of Search ........................ 425/388, 393, 425/DIG. 121; 156/212, 267, 285, 204, 213; 264/163, 249, 271.1

[56] References Cited

U.S. PATENT DOCUMENTS

| | | | |
|---|---|---|---|
| 4,692,108 | 9/1987 | Cesano | 264/163 |
| 4,923,539 | 5/1990 | Spengler et al. | 156/285 |
| 4,991,478 | 2/1991 | Riley | 83/49 |
| 5,258,083 | 11/1993 | Monk et al. | 156/212 |

FOREIGN PATENT DOCUMENTS

| | | | |
|---|---|---|---|
| 51-54669 | 5/1976 | Japan | 156/212 |
| 57-197124 | 3/1982 | Japan | 156/212 |
| 63-39320 | 2/1988 | Japan | 264/163 |
| 63-199628 | 8/1988 | Japan | 264/163 |
| 63-252741 | 10/1988 | Japan . | |
| 5-21738 | 3/1993 | Japan . | |

Primary Examiner—Jay H. Woo
Assistant Examiner—Iurie A. Schwartz
Attorney, Agent, or Firm—Limbach & Limbach L.L.P.

[57] ABSTRACT

A device is disclosed for simultaneously carrying out vacuum forming, trimming, and wrapping of a skin sheet (S) about a base material (W) in one stage in producing a molding. The device includes a mold (1) for supporting a base material (W) such that an attaching edge (F) of the base material (W) is kept afloat from the base (1A) of the mold (1), a holding-down member (6) disposed above the attaching edge (F) of the base material for holding down the skin sheet (S) mounted on the base material, and a wrapping head (4) disposed outside and below the attaching edge (F) and having a trimming edge (5). The device enables lower production costs and shortens the time cycle for the production.

2 Claims, 2 Drawing Sheets

DEVICE FOR SIMULTANEOUSLY CARRYING OUT VACUUM FORMING, WRAPPING, AND TRIMMING

BACKGROUND OF THE INVENTION

1. Field of the Invention

This invention relates to an apparatus for carrying out vacuum forming, wrapping, and trimming of resin moldings used as an interior material for door trims etc. of automobiles.

2. Description of the Prior Art

Generally a molding having a PVC skin having a foam layer, which skin is shaped by vacuum forming and glued on a base molding of a resin or woody material, is well-known as a molding good for use as an interior material for door trims of automobiles.

To produce such a molding, these three stages are required:

1) vacuum forming to shape a skin sheet into a predetermined configuration and to glue it on a base material;
2) trimming the unnecessary part of the skin sheet glued on the base material to cut it off; and
3) wrapping the peripheral part of the trimmed skin sheet and gluing this part on the rear surface of the peripheral part of the base material.

Conventionally these stages have been carried out in three successive stages by using three devices, i.e., a vacuum forming mold, a trimming mold, and a wrapping machine, or in two stages, one of a simultaneous vacuum forming and trimming by using a vacuum forming and trimming mold, and the second of wrapping after the vacuum forming and trimming. Thus, conventionally, two or three stages have been required to produce a molding. This requires a lot of costs for equipment, installation space, and workers for the equipment, and therefore takes a lot of total costs. Further, the multi-stage production causes the time cycle of the entire production to be long.

The present invention aims to resolve these drawbacks and to provide a device for simultaneously carrying out vacuum forming, trimming, and wrapping in one stage to reduce production costs and shorten the time cycle.

SUMMARY OF THE INVENTION

To achieve the purpose of the invention the device for simultaneously carrying out vacuum forming, trimming, and wrapping includes a vacuum-forming mold having a base, which mold supports the base material such that the attaching edge of the base material is kept afloat in a position above the mold base, a holding-down member vertically movable above the attaching edge of the base material so as to hold down the skin sheet, and a wrapping head disposed outside the space between the attaching edge F and the mold base, the head having a trimming edge on the top thereof, and the head being movable toward and away from the mold.

By using the above means, the device of the invention carries out vacuum forming, wrapping, and trimming as described below. First, a skin sheet is shaped by vacuum forming and is glued on a base material placed on the vacuum forming mold while the attaching edge of the base material is afloat from the mold base. Then, a holding-down member is lowered to hold down the skin sheet on the top of the attaching edge, and the wrapping head is advanced to wrap the skin sheet and glue it on the rear surface of the attaching edge. Then, the trimming edge that is mounted on the wrapping head cuts off the residual skin sheet as the wrapping head advances. Thus the entire operation is completed in one stage.

DESCRIPTION OF THE PREFERRED EMBODIMENT

Figure 1:
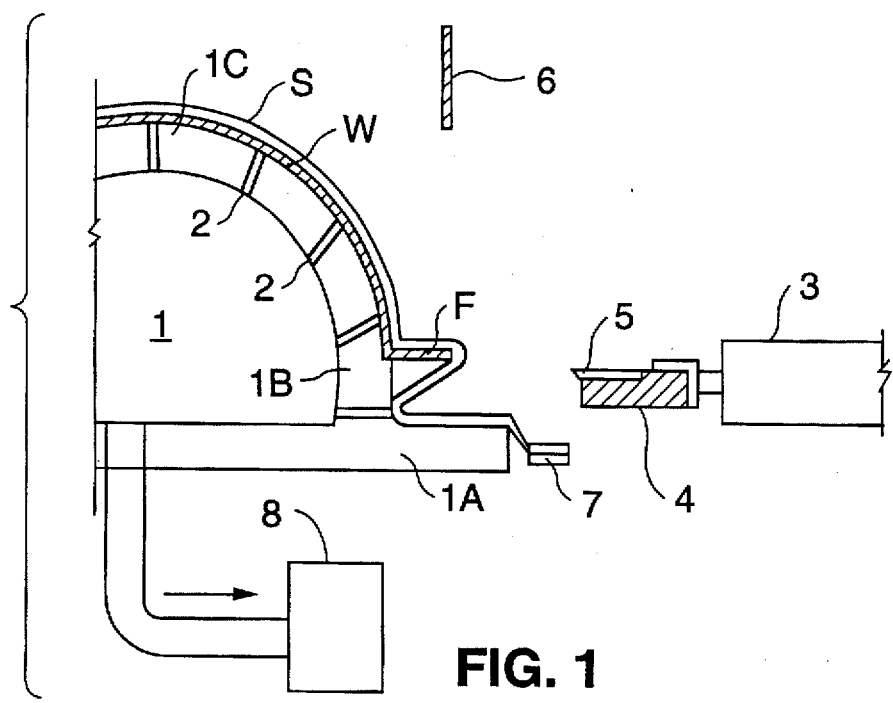
FIG. 1 is a sectional view of an initial position of an embodiment of the present invention.
Figure 2:
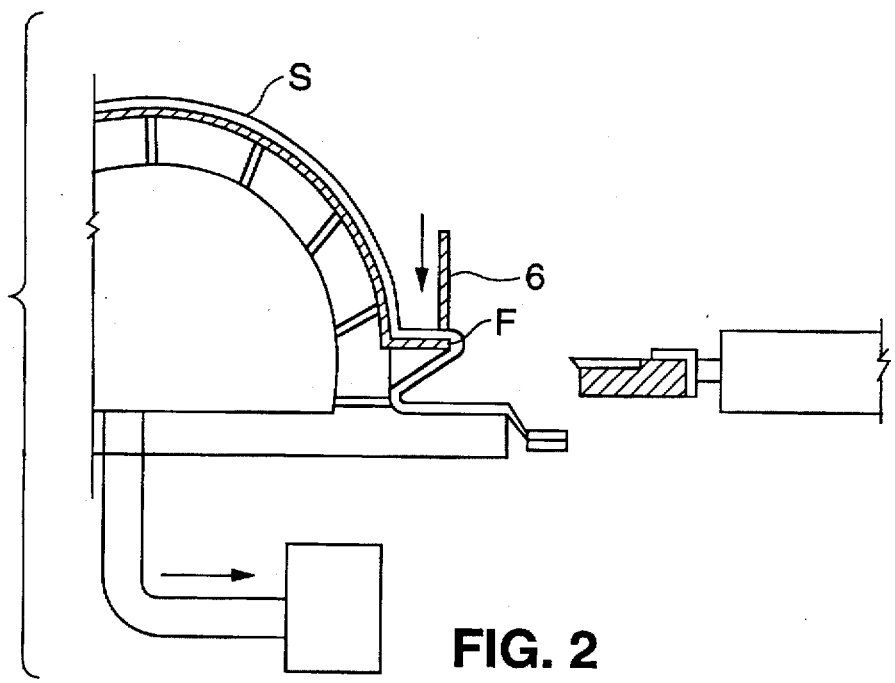
FIG. 2 is a sectional view of another position of an embodiment of the present invention.
Figure 3:
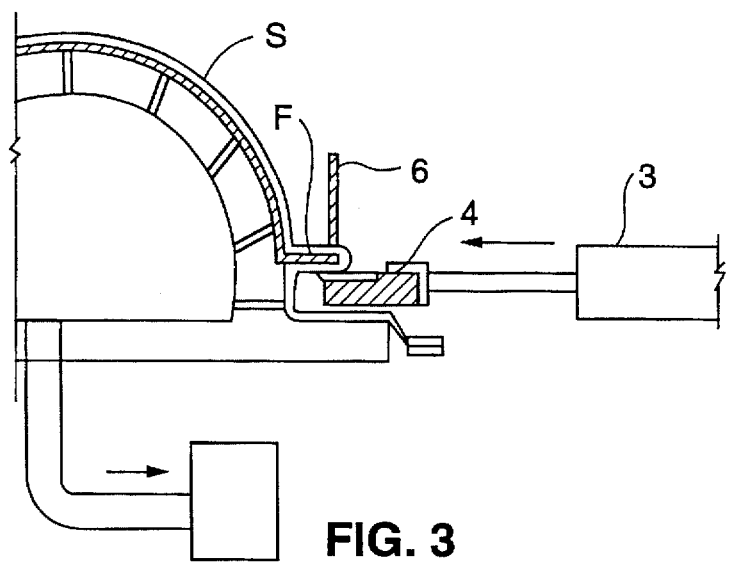
FIG. 3 is a sectional view of yet another position of the embodiment of the present invention.
Figure 4:
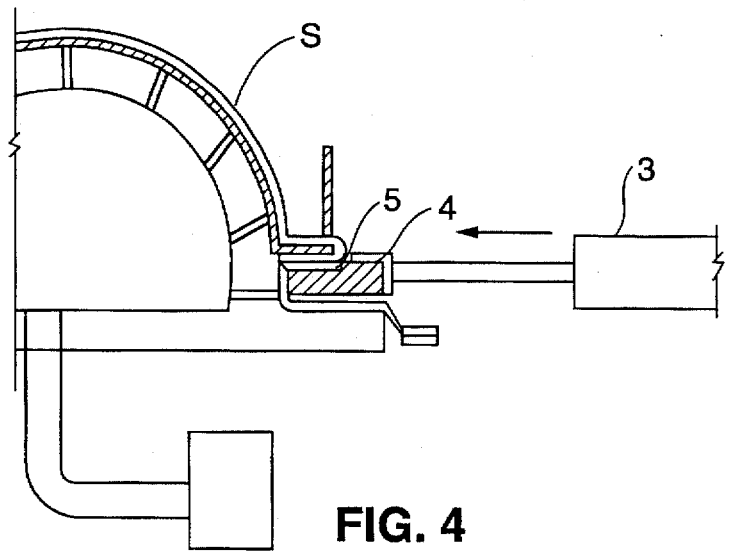
FIG. 4 is a sectional view of yet another position of the embodiment of the present invention.
Figure 5:
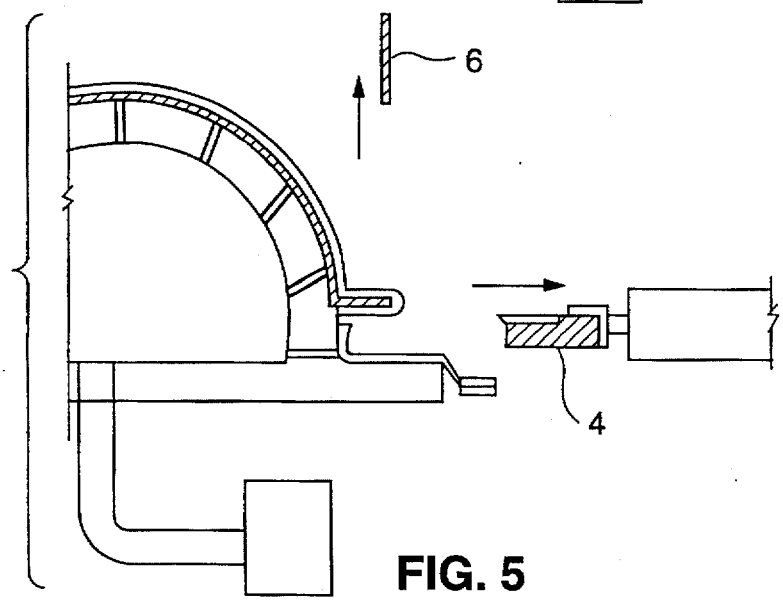
FIG. 5 is a sectional view of yet another position of the embodiment of the present invention.

The embodiment of the present invention will now be explained in detail by reference to FIGS. 1–5. As in FIG. 1, a vacuum-forming mold 1 is formed with a wall portion 1B, which stands generally upright from a base 1A of the mold, and a mold portion 1C, located above the portion 1B. A base material W is placed on the mold portion 1C. A plurality of throughbores 2, 2 are formed in the mold portion 1C to suck a skin material sheet S onto the base material W.

The base material W is formed with a laterally extending attaching edge F at the lower peripheral portion, and is configured such that the attaching edge F is afloat from the mold base 1A by a distance equal to the height of the upright wall portion 1B when the base material W is placed on the mold to cover it.

A horizontal cylinder 3 is disposed outside the position between the attaching edge F of the base material placed on the mold 1 and the mold base 1A. The cylinder 3 has a wrapping head 4 attached to a distal end of its cylinder rod. The wrapping head 4 acts to wrap the ski sheet about the attaching edge F and glue it on the rear surface of the edge F. To cut off a residual part of the skin sheet S, a trimming edge 5 is securely attached to the top of the wrapping head 4 such that the edge 5 projects from the head 4.

Further, a holding-down member 6, which is vertically moved by a cylinder (not shown) to hold down the skin sheet S, is disposed at a position below which the attaching edge F is located.

The holding-down member 6 may be vertically moved without using the cylinder (not shown). It may be mounted on a lifter mold etc. that is disposed separately. In that case, preferably a spring is disposed between the lifter mold and the holding-down member 6 to adjust the pressing force.

In the drawing, 7 denotes a damper to clamp and carry the skin sheet S, and 8 denotes a vacuum suction device that communicates with the vacuum-forming mold 1.

Now the operation of the device of the above structure to produce a molding will be explained. First, as in FIG. 1, a base material W is placed on the vacuum forming device 1, and a skin sheet S, which is clamped by the damper 7 and heated by heaters (not shown), is put on the base material W to cover it. The skin sheet S is shaped by vacuum forming and is glued on the base material W. Next, as in FIG. 2, the holding-down member 6 is lowered to the attaching edge F, and presses the skin sheet S with a force that does not deform the attaching edge F. Then, as in FIG. 3, the cylinder 3 is activated to advance the retracted wrapping head 4. Thus the skin sheet S is held between the holding-down member 6 and wrapping head 4 and is wrapped about the attaching edge F and glued on its rear surface. As the cylinder 3 continues to be activated as in FIG. 4, the trimming edge 5 cuts off the residual part of the skin sheet. After this cutting, the holding-down member 6 and wrapping head 4 return to their original positions as in FIG. 5.

As described above, a simultaneous vacuum forming, wrapping, and trimming are completed. Since in the present invention the vacuum forming, trimming, and wrapping operations are all carried out in one stage, production costs and the time cycle are reduced, thereby achieving good production efficiency.

The present invention has been described with reference to one embodiment thereof. It will be apparent to those skilled in the art that many changes can be made in the embodiment described without departing from the scope of the present invention. For example, although in this embodiment the wrapping head 4 is advanced after the skin sheet is held down by the member 6, these two stages may be simultaneously cared out to obtain the same result. Although in the above embodiment the skin sheet is cut off by pressing the trimming edge 5 against the upright wall portion 1B, a groove may be formed in the upright wall portion so that the edge 5 can enter the groove to effectively cut off the skin sheet.

What we claim is:

1. A vacuum forming, wrapping and trimming device comprising:

a base material having a horizontally extending attaching edge at the lower peripheral part thereof and having a skin sheet attached thereto;

a vacuum-forming mold capable of supporting said base material such that a space exists under said attaching edge of said base material;

holding-down means vertically movable above said attaching edge of said base material so as to hold down a first portion of said skin sheet on said horizontally extending attaching edge of said base material; and a wrapping head disposed outside the space, said head movable into said space to wrap a second portion of said skin sheet around said horizontally extending edge, said head having a trimming edge to trim a residual portion of said skin sheet, such that when said skin sheet is shaped by vacuum forming, substantially simultaneously said wrapping head moves into said space, such that substantially simultaneously said second portion of said skin sheet is wrapped around said horizontally extending attaching edge and is attached to said attaching edge, and said residual portion of said skin sheet is trimmed.

2. A device for vacuum forming, wrapping and trimming a skin sheet comprising:

a base material onto which said skin sheet is attached, said base material having a horizontally extending attaching edge at a lower peripheral portion thereof, said skin sheet being shaped by vacuum-forming;

a vacuum-forming mold having a mold base, said mold receives said base material and said skin sheet thereon such that a space exists under the horizontally extending attaching edge;

a vertically movable means for holding down a portion of said skin sheet on the horizontally extending attaching edge of said base material; and a horizontally movable wrapping head having a trimming edge, said wrapping head horizontally movable between at least a first position outside the space and a second position wherein the space receives at least the trimming edge, such that when said skin sheet is shaped by vacuum forming, substantially simultaneously said wrapping head moves into the second position such that substantially simultaneously a first portion of the skin sheet is wrapped around the horizontally extending attaching edge and is attached to said attaching edge, and a residual portion of said skin sheet is trimmed.

* * * * *